United States Patent [19]

Kukes et al.

[11] Patent Number: 4,560,466

[45] Date of Patent: Dec. 24, 1985

[54] HYDRODEMETALLIZATION OF HEAVY OILS IN THE PRESENCE OF WATER

[75] Inventors: Simon G. Kukes; Marvin M. Johnson, both of Bartlesville, Okla.

[73] Assignee: Phillips Petroleum Company, Bartlesville, Okla.

[21] Appl. No.: 665,853

[22] Filed: Oct. 29, 1984

[51] Int. Cl.$^4$ .................. C10G 45/34; C10G 45/00
[52] U.S. Cl. ...................... 208/89; 208/216 R; 208/211; 208/251 H; 208/254 R
[58] Field of Search ............. 208/89, 211, 251 H

[56] References Cited

U.S. PATENT DOCUMENTS

| | | | |
|---|---|---|---|
| 2,606,141 | 8/1952 | Meyer | 195/28 |
| 3,271,299 | 9/1966 | Kearby | 208/114 |
| 3,453,206 | 8/1969 | Gatsis | 208/210 |
| 3,501,396 | 3/1970 | Gatsis | 208/216 |
| 3,630,967 | 12/1971 | Nicklin et al. | 252/465 |
| 3,714,032 | 1/1973 | Berlolacini et al. | 208/216 |
| 3,779,895 | 12/1973 | Wilson et al. | 208/86 |
| 3,904,550 | 9/1975 | Pine | 252/437 |
| 3,928,176 | 12/1975 | Hammer et al. | 208/97 |
| 4,052,295 | 10/1977 | Pronk | 208/211 |
| 4,139,453 | 2/1979 | Hutchings | 208/251 H |
| 4,179,360 | 12/1979 | Flagg et al. | 208/139 |
| 4,203,828 | 5/1980 | Bodnick et al. | 208/213 |
| 4,233,184 | 11/1980 | Cull | 252/437 |
| 4,356,079 | 10/1982 | Desaau | 208/254 H |

OTHER PUBLICATIONS

*Heterogeneous Catalyst in Practice*, Satlerfield, McGraw-Hill p. 287.
New Collegiate Dictionary, Merriam/Webster 1977, Merriam Co. p. 852.

*Primary Examiner*—John Doll
*Assistant Examiner*—Helane Myers
*Attorney, Agent, or Firm*—K. K. Brandes

[57] ABSTRACT

An improved process for removing metals from heavy oils and other hydrocarbon feed streams is disclosed. The process comprises combining water with the hydrocarbon feed stream at a liquid volume ratio of about 1:50 to about 1:1, and contacting the mixture under suitable demetallizing conditions with hydrogen gas and a catalyst composition comprising (a) AlPO$_4$ and preferably (b) a Group VIB metal, more preferably molybdenum.

22 Claims, No Drawings

HYDRODEMETALLIZATION OF HEAVY OILS IN THE PRESENCE OF WATER

BACKGROUND OF THE INVENTION

This invention relates to an improved process for removing metals from heavy oils and other hydrocarbon feed streams.

It is well known that heavy crude oils, as well as products from extraction and/or liquefaction of coal and lignite, products from tar sands, products from oil shale and similar products may contain metals such as vanadium and nickel. The presence of the metals makes further processing of heavier fractions difficult since the metals generally act as poisons for catalysts employed in processes such as catalytic cracking, hydrogenation or hydrodesulfurization.

SUMMARY OF THE INVENTION

It is thus an object of this invention to provide a process for at least partially removing metals, particularly nickel and vanadium, from a hydrocarbon containing feed stream, particularly a heavy oil. It is another object of this invention to improve the processability of such hydrocarbon containing feed stream, particularly a heavy oil.

Other objects and advantages of the invention will be apparent from the foregoing brief description of the invention and the appended claims as well as the detailed description of the invention which follows.

In accordance with the present invention, (1) a substantially liquid hydrocarbon containing feed stream, which contains also metals, and (2) a water stream, preferably added as a substantially liquid stream, wherein the liquid volume ratio of water to hydrocarbon feed ranges from about 1:50 to about 1:1, are simultaneously contacted with hydrogen gas and a catalyst composition comprising aluminum phosphate and, preferably, at least one metal of Group VIB of the Periodic Table (as defined in College Chemistry, by W. Nebergall et al., D. C. Heath and Company, 1972; consisting of Cr, Mo and W) under suitable demetallization conditions. This invention is based on the discovery that the presence of water during the catalytic hydrotreatment of the metal-containing hydrocarbon feed in the presence of an $AlPO_4$-containing catalyst, preferably promoted with a Group VIB metal, quite unexpectedly results in enhanced removal of metals, particularly nickel and vanadium.

It is presently believed that water retards the deactivation of the $AlPO_4$-containing catalyst, preferably promoted with a Groups VIB metal, caused by deposition of coke and other deposits in the pores of said catalyst. It is further believed that water helps keep the surface and pores of the catalyst clean, e.g., by gasification of some formed coke deposits, so that metals chemically bound to heterocyclic compounds such as porphyrins, contained in the hydrocarbon feed stream, can be removed from the said heterocyclic compounds by a combination of heat, hydrogen and the presence of the $AlPO_4$-based catalyst composition and can be trapped in the pores of said catalyst composition.

Removal of the metals from the hydrocarbon containing feed stream in this manner provides for improved processability of the hydrocarbon containing feed stream in processes such as catalytic cracking, hydrogenation and hydrodesulfurization.

While many hydrocarbon feedstreams naturally contain small amounts of water, this invention in one embodiment adds a separate and a controlled amount of liquid water and contacts the hydrocarbon feed and this stream of water simultaneously, and preferably at least partially mixed, with hydrogen and the $AlPO_4$-based catalyst. Optionally, the two streams can be premixed before they are contacted with hydrogen and the catalyst.

DETAILED DESCRIPTION OF THE INVENTION

Any metal which can be trapped in the pores of the catalyst composition of the present invention can at least partially be removed from a hydrocarbon containing feed stream in accordance with the present invention. The present invention is particularly applicable to the removal of at least a portion of vanadium and nickel from hydrocarbon streams.

Metals can at least partially be removed from any suitable hydrocarbon containing feed streams including crude oil, petroleum products, heavy oil extracts, coal pyrolyzates, products from extraction and/or liquefaction of coal and lignite, products from tar sands, shale oil, shale oil products and similar products. Suitable hydrocarbon feed streams include gas oil having a boiling range from about 205° C. to about 538° C., topped crude having a boiling range in excess of about 343° C. and residuum. However, the present invention is particularly directed to heavy feed streams such as heavy crudes (e.g., Monagas heavy crude), heavy topped crudes and residua and other materials which are generally regarded as being too heavy to be distilled. These materials will generally contain the highest concentrations of metals such as vanadium and nickel (e.g., 10–2000 ppm) and will generally also contain sulfur impurities (e.g., 0.5–5 weight-%), nitrogen impurities and coke precursors. At least a partial removal of said impurities and coke precursors will generally accompany the removal of metals from these heavy feed streams in the practice of the instant invention.

The demetallization process of this invention can be carried out by means of any apparatus, whereby there is achieved a simultaneous contact of the catalyst composition, comprising aluminum phosphate and, preferably, also a Group VIB metal, with the hydrocarbon containing feed stream, water, and hydrogen under suitable demetallization conditions. The process is in no way limited to the use of a particular apparatus. The process of this invention can be carried out using a fixed catalyst bed, fluidized catalyst bed, a moving catalyst bed or a slurry-type operation (e.g., hydrovisbreaking). Presently preferred is a fixed catalyst bed. The process can be carried out as a continuous operation or as a batch process. The term hydrocarbon containing feed stream is used herein to refer to both continuous and batch processes.

The hydrocarbon containing feed stream and water can be introduced into a reactor, which contains the above-cited catalyst composition, in any suitable manner. The substantially liquid hydrocarbon stream and water, preferably a substantially liquid water stream, can be introduced essentially simultaneously into the reactor and then be contacted as an at least partially mixed liquid stream with hydrogen gas and the catalyst composition. This mode of operation is preferred for continuous processes, especially continuous fixed catalyst bed processes. The hydrocarbon feed stream and liquid water can also be premixed in a separate mechanical mixing vessel or in a vessel with circulating pumping action, or in a static mixing device, and then fed as one substantially premixed liquid stream into the reactor containing the catalyst. In batch processes, the hydrocarbon feed stream and substantially liquid water can be added to the reactor sequentially in any order before the hydrocarbon stream and water are simultaneously contacted with hydrogen gas and the aluminum phosphate catalyst, which is preferably promoted with a Group VIB metal. It is also within the scope of this invention, even though presently not preferred, to partially vaporize water and charge at least a portion of it as steam in a continuous or batch process. It is furthermore contemplated that a substantially liquid mixture of oil and water as produced by an oil well or an only partially dehydrated crude oil (preferably desalted) can be fed directly into the reactor without prior mechanical mixing of oil and water.

The liquid volume ratio of water to the hydrocarbon containing feed stream, which contains also metals, in accordance with this invention ranges from about 1:50 to about 1:1, preferably from about 1:30 to about 1:3. Even though it may be possible to carry out the process of this invention with more than 50 volume percent water, this mode of operation would generally be economically unfavorable because of higher energy and capital investment costs for heating the added liquid water, for pumping it through or agitating it in the reactor, and for finally separating it from the hydrotreated hydrocarbon stream. The added water is generally separated from the hydrocarbon feed, after the treatment in accordance with this invention, by conventional separation means such as flashing fractional distillation, centrifugation, or settling plus draining of the top layer and/or bottom layer.

The catalyst composition employed in the instant invention is any solid catalyst comprising (a) an aluminum phosphate containing material and, preferably, (b) at least one metal component (which acts as a hydrogenation promoter) selected from the metals of Group VIB of the Periodic Table, more preferably molybdenum and tungsten, most preferably molybdenum. It is presently preferred to employ substantially pure $AlPO_4$ as support material, preferably prepared by mixing an aqueous solution of an aluminum salt and an aqueous solution of ammonium phosphate at a suitable pH so as to precipitate $AlPO_4$, with is dried and then calcined in air (e.g. at about 350°–450° C.). However, it is within the scope of this invention to employ mixtures of $AlPO_4$ other well known refractory materials such as silica, alumina, clays, zeolites, titania, zirconia, magnesia, zinc oxide, boron phosphate, metal phosphates, metal titanates and the like. Generally the amount of $AlPO_4$ in such mixtures exceeds 50 weight-%. Preferably, the $AlPO_4$ component or the entire mixture is impregnated with a Group VIB metal.

It is within the scope of this invention to employ catalyst compositions that contain (a) $AlPO_4$, (b) at least one Group VIB metal, preferably Mo, and (c) at least one additional metal selected from the group consisting of metals belonging to Groups VB, VIIB, VIII and IB of the Periodic Table, such as Ni, Co, V, Mn, Cu.

The Group VIB metal component and the optionally present Group VB, VIIB, VIII and IB metal components can be incorporated in the catalyst invention by any suitable means such as impregnation of the $AlPO_4$-containing support with a suitable inorganic or organic compound of the metal(s). Preferably, the impregnated catalyst composition is then calcined in the presence of a free oxygen containing gas (e.g., air) so as to convert the metal compound(s) to the metal oxide(s). Optionally, the catalyst composition, preferably calcined, is exposed to a sulfur compound such as $H_2S$ so as to at least partially convert the metal compound(s) to the metal sulfide(s). Preferably the Group VIB metal component is present in the form of its oxide, e.g., as $MoO_3$ or $WO_3$, more preferably as $MoO_3$.

Generally the amount of the Group VIB metal in the $AlPO_4$-supported catalyst composition ranges from about 0.5 to about 20 weight-% metal, preferably ranging from about 1 to 10 weight-% metal (based on the total weight of the finished catalyst composition). The surface area of the finished catalyst generally ranges from about 2 to about 500 m$^2$/g (as determined by the BET/$N_2$ adsorption method), and its pore volume generally ranges from about 0.1 to about 4 g/cc (as determined by mercury porosimetry at 15 Kpsi Hg pressure).

The catalyst composition can be used alone in the reactor or can be used in combination with essentially inert materials such as alumina, silica, titania, zirconia, magnesia, silica-alumina, aluminum-silicates, metal titanates, metal phosphates and the like. A layer of the inert material and a layer of the catalyst composition can be used or the catalyst composition can be mixed with the inert material. Use of the inert material provides for better dispersion of the hydrocarbon containing feed stream. Also, other catalysts such as known hydrogenation and desulfurization catalysts can be used in the reactor, either as layers or mixed with the $AlPO_4$ catalyst, to achieve simultaneous demetallization, desulfurization and hydrogenation or hydrocracking if desired.

Any suitable reaction time between the catalyst composition and the hydrocarbon containing feed stream, water and hydrogen can be utilized that will result in a reduced metals content in the hydrocarbon containing stream. In general, the reaction time will range from about 0.1 to about 10 hours. In a continuous fixed bed operation, the liquid hourly space velocity (LHSV) of the hydrocarbon feed stream is in the range of about 0.10 to about 10 cc of hydrocarbon feed (oil) per cc catalyst per hour, preferably from about 0.2 to about 3 cc/cc catalyst/hr, more preferably from about 0.5 to about 2 cc/cc catalyst hour. The LHSV of the liquid water stream will be selected so as to provide a liquid volume ratio of water to hydrocarbon feed stream ranging from about 1:50 to about 1:1, preferably about 1:30 to about 1:3.

The demetallization process of the present invention can be carried out at any suitable temperature, at which a desirable degree of removal of metals from the hydrocarbon stream is achieved. The temperature will generally be in the range of about 250° C. to about 550° C., and will preferably be in the range of about 350° C. to about 450° C., more preferably about 380° C. to about 440° C. Temperatures higher than 550° C. are generally not utilized since they may have adverse effects such as excessive coking. Also, economic considerations are usually taken into account in the selection of the optimal operating temperatures. Lower temperatures than 250° C. may be used for lighter feeds.

Any suitable pressure, which keeps a major portion of the hydrocarbon feed stream substantially in the liquid state at the chosen operating temperature, can be utilized in the demetallization process. The reaction pressure will generally be in the range of up to about 5,000 psig. Preferably, the pressure will be in the range of about 100 to about 2500 psig. Higher pressures tend to reduce coke formation but operation at high pressure may have adverse economic consequences.

Any suitable quantity of hydrogen can be added to the demetallization process. The quantity of hydrogen used to contact the hydrocarbon containing feed stock will generally be in the range of about 100 to about 10,000 standard cubic feet per barrel of the hydrocarbon containing feed stream and will more preferably be in the range of about 1000 to about 6000 standard cubic feet per barrel of the hydrocarbon containing feed stream.

In general, the catalyst composition is utilized for demetallization until a satisfactory level of metals removal fails to be achieved which is believed to result from the coating of the catalyst composition with the metals being removed. It is possible to remove the metals from the catalyst composition by certain leaching procedures but these procedures are expensive and it is generally contemplated that once the removal of metals falls below a desired level, the used catalyst will simply be replaced by a fresh catalyst. The time in which the catalyst composition will maintain its activity for removal of metals will depend upon the metals concentration in the hydrocarbon containing feed streams being treated. It is believed that the catalyst composition may be used for a period of time long enough to accumulate 20-200 weight-% of metals, particularly nickel and vanadium, based on the initial weight of catalyst composition.

If the demetallization process of this invention is carried out in a refinery where hydrodesulfurization is practiced, the demetallization process can be employed before or after a hydrodesulfurization step. The fact that the hydrocarbon feed stream has been passed through a hydrodesulfurization process does not affect the demetallization process of the present invention. In case of a catalytic desulfurization step it is, however, preferred to carry out the demetallization of this invention first and thereafter desulfurize the products, preferably by a catalytic hydrotreating process, which generally removes more metals, sulfur, nitrogen and carbon precursors.

Generally the hydrocarbon feed stream, which is at least partially demetallized in accordance with this invention, is at least partially separated from the added water (preferably added as a substantially liquid stream) by conventional separating means, such as flashing or distillation or settling/draining. Generally, the at least partially demetallized hydrocarbon stream is then treated in a hydrodesulfurization reactor to remove at least a portion of sulfur impurities. Frequently, at least the thus partially hydrodesulfurized product stream is subsequently cracked, e.g., in a fluidized catalytic cracking reactor, so as to produce gasoline and other useful fuels. It is, however, within the scope of this invention to directly charge the hydrocarbon stream, which has at least partially been demetallized in accordance with this invention and which has at least partially been separated from the added water, into a cracking reactor, where the hydrocarbon stream is cracked so as to produce gasoline and other useful fuels. This mode of operation is especially feasible if hydrocarbon feed streams with low sulfur levels are utilized.

The following examples are presented to further illustrate the invention, without unduly limiting the scope of this invention.

EXAMPLE I

In this example the preparation of a Mo-promoted aluminum phosphate, to be used as a hydrotreating catalyst in accordance with this invention, is described. 375 grams (1.0 mole) of $Al(NO_3)_3.9H_2O$ and 104 grams (0.9 mole) of $NH_4H_2PO_4$ were dissolved in 400 mL of hot deionized water in a 2 liter beaker. To this solution were added with stirring 125 mL of an aqueous 29 wt-% $NH_3$ solution and 1 liter of deionized water. The formed gel-like precipitate was filtered, reslurried in water, and refiltered. The aluminum phosphate filter cake was then dried at about 240° F. and calcined at about 400° C. for about 2 hours.

The calcined aluminum phosphate was crushed and passed through a 16 mesh screen. 64 grams of the fine fraction was impregnated with a solution of 5.22 grams of ammonium molybdate in 100 mL of water. Enough water was added to the mixture to give it a cement-like consistency. Then the Mo-impregnated catalyst (containing about 3.7 wt-% Mo) was dried at 240° F.

EXAMPLE II

This example illustrates the experimental setup for investigating the demetallization of heavy oils by employing various aluminum phosphate catalysts. Oil and water (when used) were pumped by means of LAPP Model 211 (General Electric Company) pumps to a metallic mixing T-pipe where the liquids were mixed with a controlled amount of hydrogen gas. This mixture was pumped downward through a stainless steel trickle bed reactor, 28.5 inches long and 0.75 inches in diameter, fitted inside with a 0.25 O.D. axial thermocouple well. The reactor was filled with a top layer (3.5 inches below the oil/$H_2$ feed inlet) of 50 cc of low surface area (less than 1 $m^2$/gram) α-alumina, a middle layer of 50 cc of promoted aluminum phosphate catalyst, and a bottom layer of 50 cc of α-alumina. The reactor tube was heated by a Thermcraft (Winston-Salem, N.C.) Model 211 3-zone furnace. The reactor temperature was usually measured in four locations along the reactor bed by a traveling thermocouple that was moved within the axial thermocouple well. The liquid product was collected in a receiver, filtered through a glass frit, allowed to separate into two layers (when water was used) and analyzed. Exiting hydrogen gas was vented. Vanadium and nickel content in oil was determined by plasma emission analysis.

The feed was a mixture of 26 weight-% toluene and 74 weight-% Venezuelan Monagas pipeline oil having an API gravity of about 17-18, a sulfur content of about 2.15 wt-% and a Ramsbottom carbon content of about 8.5 wt-%. The hydrogen pressure was maintained at about 1000 psig in all experiments which generally lasted from about 2-6 hours. The reactor temperature (average of thermocouple readings at four reactor locations) was either 400° C. or 425° C. The liquid hourly space velocity (LHSV) of the oil feed ranged from about 0.5 to about 2 cc/cc catalyst/hour. The LHSV of the water feed ranged from about 0.05 to about 1.0 cc/cc catalyst/hour. Oil and hydrogen were passed through the catalyst bed at the reaction temperature for at least 30 minutes before any water was added so as to decompose ammonium molybdate on the catalyst to $MoO_3$.

EXAMPLE III

Results of eleven heavy oil demetallization runs using the Mo-impregnated aluminum phosphate catalyst in accordance with the procedure described in Example II are summarized in Table 1.

Data in Table II show that the addition of $H_2O$ to the feed had a detrimental effect on the demetallizing activity of a Ni, U-impregnated $AlPO_4$ catalyst. Therefore, $AlPO_4$-based catalysts that contain an actinide and/or a Group VIII metal in lieu of a Group VIB metal are not contemplated in this invention.

TABLE I

| | | LHSV (cc/cc/hr) | | Oil:Water | Feed | | | Product | | | % Removal |
|---|---|---|---|---|---|---|---|---|---|---|---|
| Run | Temp (°C.) | Oil | Water | Vol. Ratio | Ni (ppm) | V (ppm) | (Ni + V) (ppm) | Ni (ppm) | V (ppm) | (Ni + V) (ppm) | of (Ni + V) |
| 1 (Control) | 425 | 1.57 | 0 | — | 60 | 274 | 334 | 52 | 184 | 236 | 29 |
| 2 (Control) | 425 | 1.57 | 0[1] | — | 60 | 274 | 334 | 49 | 160 | 209 | 37 |
| 3 (Invention) | 425 | 1.54 | 0.05 | 31:1 | 60 | 274 | 334 | 47 | 144 | 191 | 43 |
| 4 (Invention) | 425 | 1.53 | 0.28 | 5.5:1 | 60 | 274 | 334 | 41 | 138 | 179 | 46 |
| 5 (Invention) | 425 | 1.57 | 0.92 | 1.7:1 | 60 | 274 | 334 | 30 | 95 | 125 | 63 |
| 6 (Invention) | 425 | 1.57 | 1.00 | 1.6:1 | 60 | 274 | 334 | 38 | 130 | 168 | 50 |
| 7 (Control) | 400 | 1.60 | 0 | — | 64 | 312 | 375 | 59 | 260 | 319 | 15 |
| 8 (Control) | 400 | 1.59 | 0 | — | 64 | 312 | 375 | 61 | 264 | 325 | 13 |
| 9 (Invention) | 400 | 1.62 | 0.28 | 5.8:1 | 64 | 312 | 375 | 58 | 251 | 309 | 18 |
| 10 (Invention) | 400 | 1.58 | 0.56 | 2.8:1 | 64 | 312 | 375 | 53 | 243 | 296 | 21 |
| 11 (Invention) | 400 | 1.60 | 1.22 | 1.3:1 | 64 | 312 | 375 | 44 | 204 | 248 | 34 |

[1]traces of water from previous runs were possibly present

Data in Table I clearly show that the presence of water (about 3–43 volume-%) in the oil feed had a beneficial effect on the removal of metals from the oil in the hydrotreatment on Mo-promoted aluminum phosphate at 400°–425° C. The removal of sulfur from the oil was approximately the same in control runs and in invention runs.

EXAMPLE IV

In this example the preparation of another promoted aluminum phosphate catalyst, to be used in control runs, is described. 375 grams (1.0 mole) of $Al(NO_3)_3.9H_2O$ and 103 grams of 85% $H_3PO_4$ (0.9 mole) were dissolved in 500 mL of $H_2O$. To this solution 250 mL of an aqueous 29% $NH_3$ solution was added so as to provide a pH of about 7. An $AlPO_4$ gel formed, which was filtered, reslurried in 1 liter of $H_2O$ containing 70 grams of Ni acetate. The slurry was stirred for 1 hour at room temperature. After addition of 40 mL aqueous 29% $NH_3$ to the slurry (pH: about 8), it was filtered. The Ni-impregnated aluminum phosphate was dried at about 200° F. and calcined at about 700° F. for about 2 hours.

33 grams of 10/20 mesh Ni-impregnated aluminum phosphate was treated with a solution of 8.2 grams of $UO_2(NO_3)_2.6H_2O$ and 21.6 $Ni(NO_3)_2.6H_2O$ in 60 mL of $H_2O$. This catalyst was dried at about 220° F. for about 2 hours and then calcined at about 320° C. for 1 hour. This catalyst contained about 10 wt-% Ni and about 9 wt-% U.

EXAMPLE V

Results of heavy oil demetallization runs employing the above-described Ni,U-impregnated aluminum phosphate catalyst in accordance with the procedure described in Example II are summarized in Table II.

We claim:

1. A process for at least partially removing at least one metal from a hydrocarbon containing feed stream, which also contains metals, by simultaneously contacting said feed stream under demetallization conditions with water, hydrogen and a catalyst composition comprising (a) aluminum phosphate, and (b) at least one metal component selected from the group of metals belonging to Group VIB of the periodic Table, wherein water is added as a substantially liquid stream and is at least partially mixed with said hydrocarbon feed stream before said simultaneous contacting with hydrogen and the catalyst composition, and the liquid volume ratio of water to the hydrocarbon feed stream ranges from about 1:50 to about 1:1.

2. A process in accordance with claim 1 wherein the catalyst composition comprises (a) $AlPO_4$ and (b) a metal component selected from the group consisting of molybdenum and tungsten.

3. A process in accordance with claim 2 wherein the metal component is molybdenum.

4. A process in accordance with claim 3 wherein the amount of molybdenum ranges from about 0.5 to about 20 weight based on the total weight of said catalyst composition.

5. A process in accordance with claim 4 wherein the liquid volume ratio of water to hydrocarbon feed stream ranges from about 1:30 to about 1:3.

6. A process in accordance with claim 1 wherein said hydrocarbon containing feed stream is selected from the group consisting of crude oil, topped crude, residuum, heavy oil extract, coal pyrolyzate, coal extract and shale oil.

7. A process in accordance with claim 6 wherein the metals contained in the hydrocarbon containing feed

TABLE II

| | | LHSV (cc/cc/hr) | | Oil:Water | Feed | | | Product | | | % Removal |
|---|---|---|---|---|---|---|---|---|---|---|---|
| Run | Temp (°C.) | Oil | Water | Vol. Ratio | Ni (ppm) | V (ppm) | (Ni + V) (ppm) | Ni (ppm) | V (ppm) | (Ni + V) (ppm) | of (Ni + V) |
| 12 (Control) | 425 | 1.58 | 0 | — | 78 | 294 | 372 | 17 | 26 | 43 | 82 |
| 13 (Control) | 425 | 1.59 | 0 | — | 78 | 294 | 372 | 31 | 63 | 94 | 75 |
| 14 (Control) | 425 | 1.59 | 0.18 | 8.8:1 | 78 | 294 | 372 | 45 | 174 | 219 | 41 |
| 15 (Control) | 400 | 1.60 | 0.18 | 8.9:1 | 78 | 294 | 372 | 65 | 256 | 321 | 14 |
| 16 (Control) | 400 | 1.61 | 0.40 | 4.0:1 | 78 | 294 | 372 | 62 | 269 | 331 | 11 | stream is at least one of the group consisting of vanadium and nickel.

8. A process in accordance with claim 4 wherein said hydrocarbon feed stream is selected from the group consisting of crude oil, topped crude, residuum, heavy oil extract, coal pyrolyzate, coal extract and shale oil.

9. A process in accordance with claim 8 wherein the metals contained in the hydrocarbon feed stream are vanadium and nickel.

10. A process in accordance with claim 1 wherein said demetallization conditions comprise a liquid hourly space velocity of said hydrocarbon containing feed stream in the range of about 0.1 to about 10 cc/cc catalyst/hour, a temperature in the range of 250° C. to about 550° C., a pressure in the range of up to about 5000 psig, and a hydrogen flow rate in the range of about 100 to about 10,000 standard cubic feet per barrel of said hydrocarbon containing feed stream.

11. A process in accordance with claim 10 wherein said demetallization conditions comprise a liquid hourly space velocity of said hydrocarbon containing feed stream in the range of about 0.2 to about 3 cc/cc catalyst/hour, a temperature in the range of 350° C. to about 450° C., a pressure in the range of about 100 psig to about 2500 psig, and a hydrogen flow rate in the range of about 1000 to about 6,000 standard cubic feet per barrel of said hydrocarbon containing feed stream.

12. A process in accordance with claim 4 wherein said suitable demetallization conditions comprise a liquid hourly space velocity of said hydrocarbon containing feed stream in the range of about 0.1 to about 10 cc/cc catalyst/hour, a temperature in the range of 250° C. to about 550° C., a pressure in the range of up to about 5000 psig, and a hydrogen flow rate in the range of about 100 to about 10,000 standard cubic feet per barrel of said hydrocarbon containing feed stream.

13. A process in accordance with claim 12 wherein said suitable demetallization conditions comprise a liquid hourly space velocity of said hydrocarbon containing feed stream in the range of about 0.2 to about 3 cc/cc catalyst hour, a temperature in the range of 350° C. to about 450° C., a pressure in the range of about 100 psig to about 2500 psig, and a hydrogen flow rate in the range of about 1000 to about 6,000 standard cubic feet per barrel of said hydrocarbon containing feed stream.

14. A process in accordance with claim 13 wherein the temperature ranges from about 380° C. to about 440° C., and the liquid hourly space velocity of the hydrocarbon containing feed stream is in the range of about 0.5 to about 2 cc/cc catalyst/hour.

15. A process for purifying a hydrocarbon feed stream, which contains metals, comprising the steps of:
(a) combining said hydrocarbon feed stream with a substantially liquid water stream at a liquid volume ratio of water to said hydrocarbon feed ranging from about 1:50 to about 1:1;
(b) contacting the combined, at least partially mixed stream of hydrocarbon feed and water under demetallizing conditions simultaneously with hydrogen and a catalyst composition comprising aluminum phosphate and at least one Group VIB metal component so as to produce an at least partially demetallized hydrocarbon containing stream;
(c) separating at least a portion of water from the hydrocarbon containing stream which has at least been partially demetallized in step (b).

16. A process in accordance with claim 15 wherein said hydrocarbon feed stream also contains sulfur impurities comprising the additional step of:
(d) hydrotreating at least a portion of the at least partially demetallized hydrocarbon stream, from which at least a portion of water has been separated, so as to remove at least a portion of sulfur impurities.

17. A process in accordance with claim 16 comprising the additional step of:
(e) treating the hydrocarbon stream, which has been hydrotreated in step (d), in a cracking reactor so as to produce gasoline and other useful fuels.

18. A process in accordance with claim 15 wherein the hydrocarbon feed stream is selected from the group consisting of crude oil, topped crude, residuum, heavy oil extract, coal pyrolyzate, coal extract and shale oil.

19. A process in accordance with claim 15 wherein said demetallizing conditions comprise a liquid hourly space velocity of said hydrocarbon containing feed stream is in the range of about 0.1 to about 10 cc/cc catalyst/hour, a temperature in the range of 250° C. to about 550° C., a pressure in the range of up to about 5000 psig and a hydrogen flow rate in the range of about 100 to about 10,000 standard cubic feet per barrel of said hydrocarbon containing feed stream.

20. A process for producing gasoline and other useful fuels from a hydrocarbon feed stream containing metals comprising the steps of:
(a) combining said hydrocarbon feed stream with a substantially liquid water stream at a liquid volume ratio of water to said hydrocarbon feed ranging from about 1:50 to about 1:1;
(b) contacting the combined, at least partially mixed stream of hydrocarbon feed and water under suitable demetallizing conditions simultaneously with hydrogen and a catalyst composition comprising aluminum phosphate and at least one metal component selected from molybdenum and tungsten;
(c) separating at least a portion of water from the hydrocarbon stream, which has at least partially been demetallized in step (b);
(d) treating at least a portion of the at least partially demetallized hydrocarbon, from which at least a portion of water has been separated, in a cracking reactor so as to produce gasoline and other useful fuels.

21. A process in accordance with claim 15 wherein said Group VIB metal is molybdenum.

22. A process in accordance with claim 16 wherein said Group VIB metal is molybdenum.

* * * * *